United States Patent [19]

Langley et al.

[11] 3,770,474

[45] Nov. 6, 1973

[54] PROCESS FOR PREPARING PHTHALOCYANINE BLUE PIGMENTS

[75] Inventors: Robert Langley, Newton Mearns; Ronald Francis John Richards, Paisley; William Gill Warwick, Bridge of Weir, all of Scotland

[73] Assignee: Ciba-Geigy AG, Basel, Switzerland

[22] Filed: Aug. 4, 1970

[21] Appl. No.: 60,952

[30] Foreign Application Priority Data
Aug. 13, 1969 Great Britain.................. 40,453/69

[52] U.S. Cl. ........................................... 106/288 Q
[51] Int. Cl............................................. C08h 17/14
[58] Field of Search........................ 106/288 Q, 309

[56] References Cited
UNITED STATES PATENTS

| | | | |
|---|---|---|---|
| 2,799,594 | 7/1957 | Ehrich | 106/288 Q |
| 2,805,957 | 9/1957 | Ehrich | 106/288 Q |
| 2,602,800 | 7/1952 | Barnhart | 260/314.5 |
| 3,370,065 | 2/1968 | Nold et al. | 260/314.5 |

*Primary Examiner*—James E. Poer
*Attorney*—Wenderoth, Lind and Ponack

[57] ABSTRACT

Phthalocyanine blue pigments are prepared in pigmentary form by preparing a crude phthalocyanine in a high-boiling inert organic solvent, slurrying the mixture with concentrated sulphuric acid, drowning out into water or aqueous alkali and steam distilling off the solvent.

17 Claims, No Drawings

PROCESS FOR PREPARING PHTHALOCYANINE BLUE PIGMENTS

DESCRIPTION OF THE INVENTION

The present invention relates to a process for the production of phthalocyanine blue pigments in satisfactory pigmentary form.

In conventional processes for the preparation of pigmentary phthalocyanine blue, the crude material is usually isolated from the reaction mixture by steam distilling off the solvent, filtering, slurrying the presscake with acid, refiltering, washing and drying. The crude phthalocyanine is then converted into a usable pigmentary form by a conditioning process such as acid pasting or salt grinding, after which it has again to be pressed and washed to remove the acid (or salt) and dried a second time. This procedure involves considerable time and expense in that it involves three pressings or filtrations, two drying stages and a steam distillation.

We have unexpectedly found that by using a halogenated phthalocyanine or a nitro-substituted phthalocyanine, a pigment of extremely good strength can be produced by a shorter and cheaper process, whereby it is unnecessary to isolate the phthalocyanine crude from the reaction mixture before converting to pigmentary form.

According to the present invention there is provided a process for the production of a phthalocyanine blue pigment which comprises preparing a crude phthalocyanine substituted by at least 0.3 halogen atoms or nitro groups per molecule of phthalocyanine in a high boiling inert organic solvent, stirring the mixture with concentrated sulphuric acid, drowning out into water or aqueous alkali, and steam distilling off the solvent. If desired, the pigment may afterwards be isolated by conventional means, for instance by filtration and drying.

The phthalocyanine pigment produced by the present invention is preferably a metal phthalocyanine, especially copper phthalocyanine. The substituent in the phthalocyanine molecule may, for instance, be in the 4-position and may advantageously be chlorine, the amount of substituent is preferably in the range of from 0.5 to 1.2 halogen atoms or nitro group per molecule of the resulting phthalocyanine.

The crude phthalocyanine pigment used in the process of the invention may be prepared by a conventional process, for instance crude monochloro copper phthalocyanine blue, may be prepared either from phthalodinitrile or from 4-chloro-phthalic acid, phthalic anhydride and urea in a slight modification of the standard "urea process" for unsubstituted blue.

The process is advantageously carried out in a solvent which is not decomposed during the process and/or which does not react with the acid. The solvent is preferably miscible with the acid. Preferably, the solvent has a boiling point at a temperature greater than 150° C. Examples of solvents that may thus conveniently be used include chlorinated hydrocarbons (for example o-dichloro-benzene and trichlorobenzene), high boiling kerosenes, nitrobenzene and o-nitrotoluene; however, nitrobenzene has been found to be particularly advantageous. The solvent is used in an amount sufficient to give a mixture which can be readily stirred; this amount may be, for instance, in the range of from 2 to 10 parts by weight of solvent per part by weight of crude phthalocyanine.

The concentration of sulphuric acid with which the crude is stirred is preferably within the range of from 90 to 100 percent. If desired, the amount of sulphuric acid added to the pigment in this way may be within the range of from 0.1 to 15 parts by weight of acid per part by weight of pigment but is preferably in the range of from 2 to 8 parts by weight of acid per part by weight of pigment. The mixture may conveniently be stirred over a wide range of temperature, for instance, from 20° to 100° C and preferably from 50° to 80° C. The time of stirring may vary within a wide range but is preferably between 30 minutes and 4 hours.

The amount of water or aqueous alkali at the drown out stage may vary within the a wide range, for instance from 1 to 40 times the weight of the acid used, but is preferably from 5 to 15 times the weight of acid used. Where the mixture is drowned out into water, the pigment may, for instance, be washed acid-free by successive washings and decantations. When aqueous alkali is used, the acid is neutralised. The solvent is then removed by steam-distillation and the pigment may afterwards be recovered by filtration, washing and drying.

According to a particular embodiment of the present invention there may be added to the pigment mixture a dispersing/softening agent for instance the sodium salt or rosin, sodium di-octyl sulphosuccinate, Turkey red oil, mineral oil or sodium oleate.

Although the dispersing/softening agent may be added at any stage during the process it is preferably added before the solvent is removed by steam distillation. After steam-distillation the dispersing/softening agent, if in alkaline solution, may be precipitated by any suitable method, for any suitable method, for instance with dilute acid, such as sulphuric acid, a salt of a Group 2 metal, for example calcium chloride, or the salt of an amine, for example 2-ethyl hexylamine acetate.

The precipitation agent may be added in excess, preferably about 10 percent excess and may conveniently be added to the pigment/dispersing agent with stirring. The precipitation may advantageously be carried out at room temperature although higher temperatures may be used. Where there is a high dispersing agent content such as rosin or sodium di-octyl sulphosuccinate, the precipitation may, if desired, be accompanied by high speed stirring. When the pigment is required to have non-flocculating properties, an additive which imparts such properties may conveniently be added, for instance "Solophenyl Turquoise Blue GRL" ("Solophenyl" is a Trade Mark), having the formula:

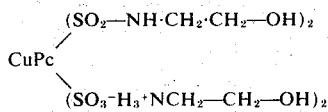

The present invention also provides pigments when prepared by the process of the present invention.

The pigments of the present invention have been found to be of value in a wide variety of organic media capable of colouration by pigmentation, for instance inks, plastics, paints and lacquers.

The present invention therefore provides compositions containing phthalocyanine pigments produced by the process of the present invention.

The following Examples further describe the present invention. Parts and percentages are expressed by weight unless otherwise stated.

Example 1

A monochlorinated copper phthalocyanine blue was prepared from phthalodinitrile in nitrobenzene by the following method.

128 Parts of phthalodinitrile and 33.5 parts of anhydrous cupric chloride in 400 parts of nitrobenzene solvent were heated up with stirring above 200° C and held at this temperature until the reaction was complete.

An amount of the phthalocyanine mixture thus prepared and containing 25 parts of the copper phthalocyanine blue was stirred with 100 parts of 98 percent sulphuric acid at 60° C for 2 hours.

The slurry was then drowned out into 1,000 parts of water and the pigment was washed free from acid by successive washings and decantations. The pigment/nitrobenzene mass was then refluxed with an alkaline solution of 10 percent, on the weight of pigment, of Beckacite Resin P454F (a fumaric modified (Diels-Alder) wood resin) for 4 hours and the nitrobenzene was removed by steam distillation. The resin was precipitated with calcium chloride and the pigment filtered off, washed and dried.

The resultant pigment was a red shade blue and was tinctorially strong.

Example 2

A monochlorinated crude copper phthalocyanine blue was prepared from 4-chlorophthalic acid in nitrobenzene by the following method.

32.2 Parts of 4-chlorophthalic acid, 71.5 parts of phthalic anhydride, 24 parts of cupric chloride, 186 parts of urea and 1 part of ammonium molybdate catalyst in 410 parts nitrobenzene solvent were slowly heated with stirring to 170° C and held at this temperature until the reaction was complete.

An amount of mixture containing 25 parts of copper phthalocyanine was dissolved in 275 parts sulphuric acid mono-hydrate and stirred at 80° C for 4 hours. The slurry was drowned out into 2,000 parts of water and the pigment washed acid free by successive washings and decantations. This process was facilitated because the pigment and nitrobenzene coalesced and settled, so permitting ready removal of the supernatant acid.

The pigment-solvent mass thus prepared was mixed with 10 percent on the weight of the pigment of Beckacite P454F resin solution. The nitrobenzene solvent was removed by steam distillation and the resin precipitated with dilute sulphuric acid prior to filtration and drying. The resultant pigment had similar colouristic properties to those of the pigment obtained in Example 1.

Example 3

A monochlorinated crude copper phthalocyanine blue was prepared from 4-chlorophthalic acid in nitrobenzene as described in Example 2.

An amount of the phthalocyanine mixture thus prepared and containing 25 parts of copper phthalocyanine was stirred in 50 parts of 98 percent sulphuric acid at 40° C for 1 hour and then neutralised by addition to an aqueous solution of potassium hydroxide. The resulting suspension was refluxed with 50 percent on the weight of pigment of Beckacite P454F resin for 4 hours, nitrobenzene was then removed by steam distillation and, after cooling, the resin was precipitated by adding calcium chloride with high speed stirring. The pigment so prepared was filtered and dried.

Example 4

A monochlorinated crude copper phthalocyanine blue was prepared from 4-chlorophthalic acid in nitrobenzene as described in Example 2.

An amount of the phthalocyanine mixture thus prepared and containing 25 parts of copper phthalocyanine was stirred with 50 parts of 90 percent of sulphuric acid and 1 part of "Solophenyl Turquoise Blue GRL" for 2 hours at 60° C. This was then diluted by drowning out into water and a 10 percent on the weight of pigment quantity of Staybelite Ester 10 resin the glycerol ester of wood rosin, dissolved in nitrobenzene was added to the acid mixture which was then steam distilled to remove nitrobenzene. A pigment with good strength and non-flocculating properties in alkyd paint media was obtained by filtering and drying.

Example 5

A monochlorinated crude copper phthalocyanine blue was prepared from phthalodinitrile in nitrobenzene as described in Example 1.

An amount of the phthalocyanine mixture thus prepared and containing 25 parts of chlorinated copper phthalocyanine was stirred in 50 parts of 98 percent sulphuric acid at 60° C for 2 hours and then drowned out into 500 parts water containing 2.5 parts of mineral oil.

The mixture was heated under reflux for 8 hours and then the solvent was steam-distilled off and the pigment filtered, washed and dried. The pigment was a red shade blue and strong with good dispersibility when incorporated into gravure ink systems.

Example 6

A monochlorinated copper phthalocyanine blue was prepared from phthalodinitrile in nitrobenzene as described in Example 1.

An amount of the phthalocyanine mixture thus prepared and containing 25 parts of the phthalocyanine was stirred with 75 parts of concentrated sulphuric acid for 4 hours at 60° C. The slurry was then drowned out into 1,250 parts of water and then washed acid-free by decantation and pH adjusted to approx. 8.0.

0.85 Part of dipropylene glycol monolaurate was added and the mixture refluxed for 8 hours. The nitrobenzene was steam distilled off and the pigment filtered, washed and dried. The resultant pigment was strong and red shade blue in paint with non-crystallizing properties. It was red shade blue, strong and non-crystallizing in ink systems, producing inks with good flow and was easily dispersible in plasticised P.V.C. systems.

Example 7

A monochlorinated copper phthalocyanine blue was prepared from phthalodinitrile in nitrobenzene as described in Example 1.

An amount of the phthalocyanine thus prepared and containing 25 parts of chlorinated copper phthalocyanine was stirred with 75 parts of 98 percent sulphuric acid for 2 hours at 60° C and then drowned out into water. The mixture was washed acid-free by decantation and then 5 parts of sodium dioctyl sulphosuccinate were added and the mixture steam-distilled free of nitrobenzene. The mixture was then stirred at high speed for 1 hour and then a solution of aluminium chloride was slowly added over 1 hour while continuing the high speed stirring until the precipitation of the sulphosuccinate as the aluminium salt was complete. The pigment was filtered, washed and dried. It was found to be a strong, red shade blue pigment with good strength, dispersibility and stability in gravure ink systems.

In contrast to the foregoing Examples of the invention, the following Comparative Process shows that by using a procedure outside the present invention whereby an unsubstituted crude copper phthalocyanine is used, a weak pigment is produced which is crystallized in the $\beta$-form.

Comparative Process

The procedure described in Example 1 was carried out except that unchlorinated phthalocyanine blue was used instead of the monochlorinated phthalocyanine there used. The resultant pigment, when incorporated into paint compositions by conventional methods, was very weak and was in the $\beta$-crystalline form.

We claim:

1. A process for preparing a phthalocyanine blue pigment in pigmentary form which comprises preparing a crude phthalocyanine substituted by 0.3 to 1.2 halogen atoms or at least 0.3 nitro groups per molecule of phthalocyanine in a high-boiling inert organic solvent, stirring the mixture at 20° to 80° C with 2 to 8 parts by weight of concentrated sulphuric acid per part by weight of pigment, drowning out the resultant pigment into water or aqueous alkali and steam distilling off the solvent.

2. The process as claimed in claim 1, wherein there is added to the pigment mixture a substance which is a dispersing and softening agent.

3. The process as claimed in claim 1 wherein there is added to the pigment mixture a product which imparts non-flocculating properties to the pigment.

4. The process as claimed in claim 1 wherein the phthalocyanine pigment is a copper phthalocyanine.

5. The process as claimed in claim 1 wherein the amount of substituent is in the range of from 0.5 to 1.2 halogen atoms or nitro groups per molecule of the resulting phthalocyanine.

6. The process as claimed in claim 1 wherein the phthalocyanine is substituted by chlorine in the 4-position.

7. The process as claimed in claim 1 wherein the high-boiling inert organic solvent is a kerosene, o-dichlorobenzene, trichlorobenzene or o-nitrotoluene.

8. The process as claimed in claim 1 wherein the high-boiling inert organic solvent is nitrobenzene.

9. The process as claimed in claim 1 wherein the amount of the high boiling inert organic solvent is in the range of from 2 to 10 parts by weight of solvent per part by weight of crude phthalocyanine.

10. The process as claimed in claim 1 wherein the phthalocyanine mixture is stirred with sulphuric acid at a temperature in the range of from 50° to 80° C.

11. The process as claimed in claim 1 wherein the amount of water or aqueous alkali used in the drowning out stage is from 5 to 15 times the weight of acid used.

12. The process as claimed in claim 1 wherein the pigment is drowned out into water and washed acid free by successive washings and decantations.

13. The process as claimed in claim 2 wherein the dispersing and softening agent is the sodium salt of rosin, sodium di-octyl sulphosuccinate, Turkey Red Oil, mineral oil or sodium oleate.

14. The process as claimed in claim 2 wherein the dispersing and softening agent is precipitated onto the pigment with dilute acid, a salt of a Group 2 metal, or the salt of an amine.

15. The process as claimed in claim 14 wherein the dispersing and softening agent is precipitated onto the pigment with dilute sulphuric acid, calcium chloride or 2-ethylhexylamine acetate.

16. The process as claimed in claim 3 where the product which imparts non-flocculating properties has formula:

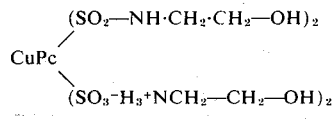

17. The process as claimed in claim 1 wherein the substituent is a nitro group.

* * * * *